United States Patent
Payne

(10) Patent No.: US 6,471,269 B1
(45) Date of Patent: Oct. 29, 2002

(54) SUPPORT SYSTEM

(76) Inventor: Robert W. Payne, 5512 60th Way N., St. Petersburg, FL (US) 33709

( * ) Notice: Subject to any disclaimer, the term of this patent is extended or adjusted under 35 U.S.C. 154(b) by 2 days.

(21) Appl. No.: 09/607,051

(22) Filed: Jun. 29, 2000

(51) Int. Cl.[7] .................................................. B25J 1/04
(52) U.S. Cl. ........................................................ 294/19.1
(58) Field of Search .......................... 294/19.1, 74, 75; 114/221 R, 230.2, 230.25; 119/802–804; 182/142, 143

(56) References Cited

U.S. PATENT DOCUMENTS

| | | | | | |
|---|---|---|---|---|---|
| 3,588,161 A | * | 6/1971 | Sayre et al. | ................ | 294/19.1 |
| 3,677,597 A | * | 7/1972 | Stipek | ........................ | 294/19.1 |
| 3,774,953 A | * | 11/1973 | Babcock | .................... | 294/19.1 |
| 3,841,685 A | * | 10/1974 | Kolodziej | .................. | 294/19.1 |
| 3,918,385 A | * | 11/1975 | Wallace | ................. | 294/19.1 X |
| 4,635,986 A | * | 1/1987 | Johns | ........................ | 294/19.1 |
| 4,895,407 A | * | 1/1990 | Mozer | ........................ | 294/19.1 |
| 5,116,260 A | * | 5/1992 | Upchurch | .............. | 294/19.1 X |
| 5,292,160 A | * | 3/1994 | Deichman | .................. | 294/19.1 |
| 5,622,399 A | * | 4/1997 | Albright | ................ | 294/19.1 X |
| 5,699,748 A | * | 12/1997 | Linskey et al. | ......... | 294/19.1 X |
| 5,704,669 A | * | 1/1998 | Clark | ........................ | 294/19.1 |
| 6,273,017 B1 | * | 8/2001 | Griffin | .................... | 114/230.25 |

* cited by examiner

Primary Examiner—Johnny D. Cherry

(57) ABSTRACT

A short cable is configured to form a major loop around a vertical generally cylindrical member. The short cable contains a first free end with a first minor loop and a second free end with a second minor loop. The first free end of the short cable extends through the second minor loop at the second free end and then downwardly with a fixed link. The fixed link is pulled to tighten the major loop and short cable around a vertical generally cylindrical member at an elevated location and to then support a load. A long cord has a free upper end coupled to the second minor loop and a free lower end. An intermediate extent passes through the first minor loop whereby pulling the lower end of the cord to allow the releasing and lowering of the short cable.

4 Claims, 6 Drawing Sheets

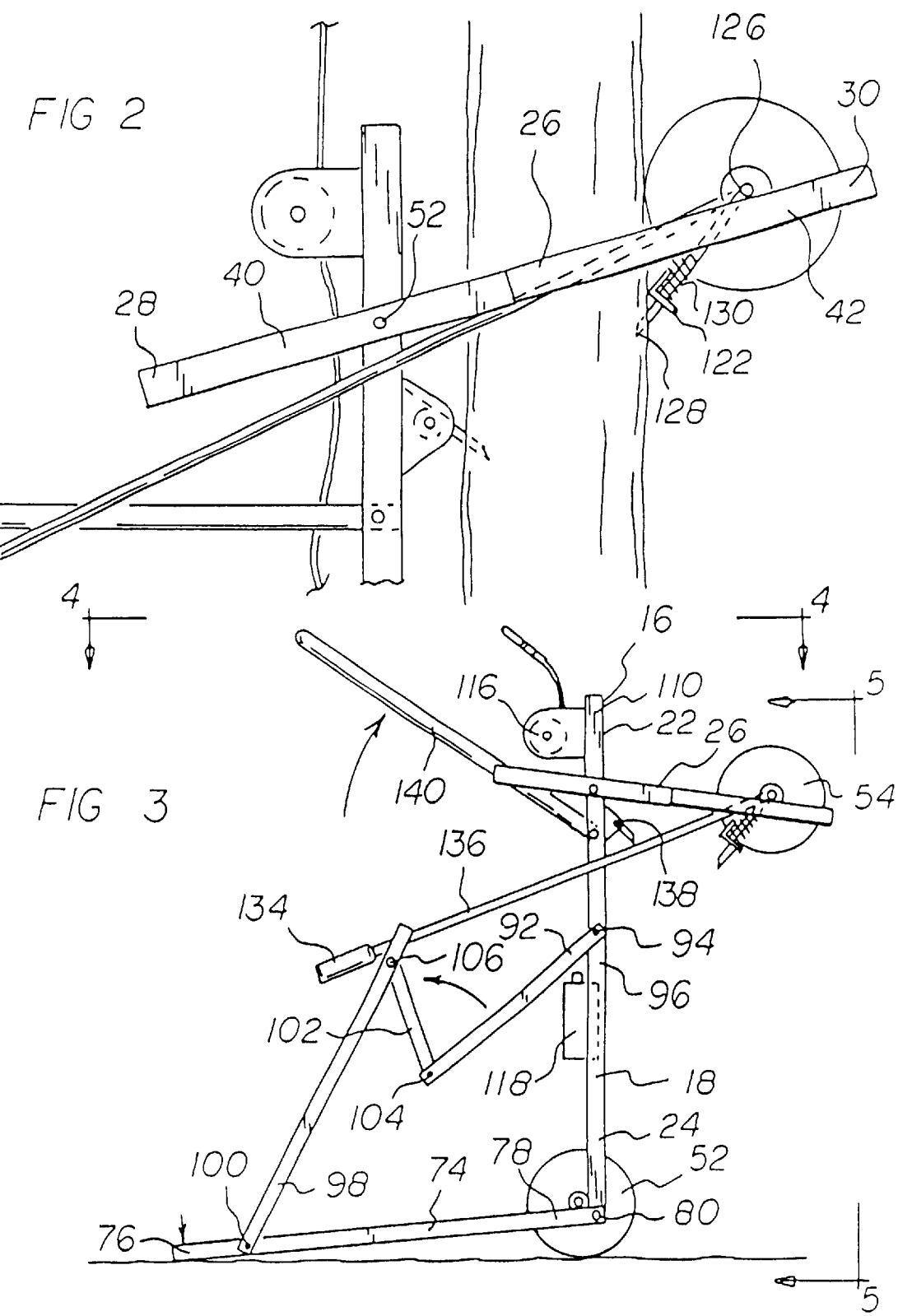

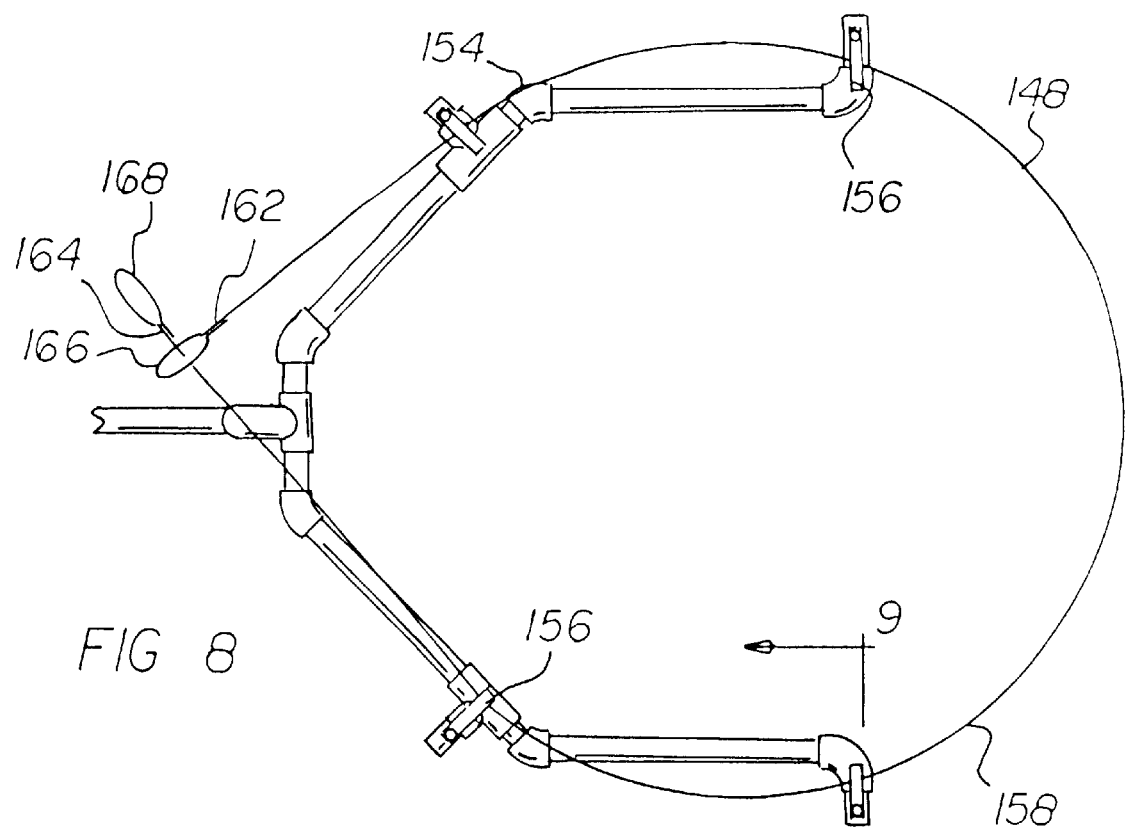
FIG 8
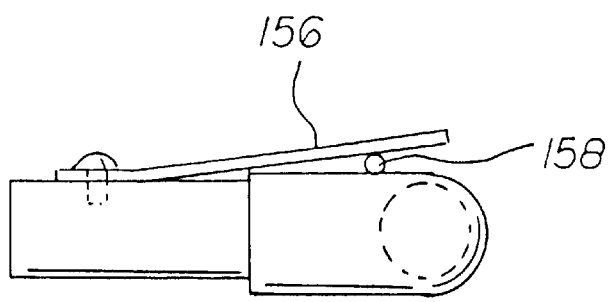
FIG 9

SUPPORT SYSTEM

BACKGROUND OF THE INVENTION

1. Field of the Invention

The present invention relates to a tree stand system and more particularly pertains to a system for lifting and retaining and then releasing a load on a tree.

2. Description of the Prior Art

The use of tree stand systems of known designs and configurations is known in the prior art. More specifically, tree stand systems of known designs and configurations previously devised and utilized for the purpose of lifting and retaining and then releasing a load on a tree through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,688,657 to Ericson discloses a portable elevating device. U.S. Pat. No. 5,009,284 to Authement discloses a chair lift apparatus. U.S. Pat. No. 4,602,698 to Grant discloses a hunting chair. U.S. Pat. No. 4,811,803 to Green discloses a deer stand. Lastly, U.S. Pat. No. 5,779,002 to Paton discloses an astronaut's work out device. While these devices fulfill their respective, particular objectives and requirements, the aforementioned patents do not describe a tree stand system for lifting and retaining and then releasing a load on a tree through known methods and apparatuses that allows lifting and retaining and then releasing a load on a tree.

In this respect, the tree stand system according to the present invention substantially departs from the conventional concepts and designs of the prior art, and in doing so provides an apparatus primarily developed for the purpose of lifting and retaining and then releasing a load on a tree.

Therefore, it can be appreciated that there exists a continuing need for a new and improved tree stand system which can be used for lifting and retaining and then releasing a load on a tree. In this regard, the present invention substantially fulfills this need.

SUMMARY OF THE INVENTION

In view of the foregoing disadvantages inherent in the known types of tree stand systems of known designs and configurations now present in the prior art, the present invention provides an improved tree stand system. As such, the general purpose of the present invention, which will be described subsequently in greater detail, is to provide a new and improved tree stand system and method which has all the advantages of the prior art and none of the disadvantages.

To attain this, the present invention essentially comprises a tree stand system for lifting and retaining and then releasing a load on a tree.

The system includes a short cable containing a plurality of wires twisted together. The short cable is configured to form a major loop around the tree containing a first free end with a first minor loop and a second free end with a second minor loop. The first free end of the short cable extends through the second minor loop at the second free end and then downwardly with a fixed chain link. The fixed chain link is pulled to tighten the major loop and short cable around a tree at an elevated location and to then support a load. The system also contains a long cord containing a plurality of braided strings. The cord includes a free upper end coupled to the second minor loop, a free lower end and an intermediate extent passing through the first minor loop whereby pulling the lower end of the cord will enlarge the major loop to allow the releasing and lowering of the cable.

A long cable, coupled to the fixed chain link and the second minor loop supports a load at an intended height on the tree. The system also includes a cable positioning member including a C-shaped upper component with a plurality of resilient fingers for releasably supporting the short cable configured in a major loop around a tree. The cable positioning member also includes a long rod for elevating the upper component and short cable to an intended height.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tree stand system which has all of the advantages of the prior art tree stand systems of known designs and configurations and none of the disadvantages.

It is another object of the present invention to provide a new and improved tree stand system which may be easily and efficiently manufactured and marketed.

It is further object of the present invention to provide a new and improved tree stand system which is of durable and reliable constructions.

An even further object of the present invention is to provide a new and improved tree stand system which is susceptible of a low cost of manufacture with regard to both materials and labor, and which accordingly is then susceptible of low prices of sale to the consuming public, thereby making such support system economically available to the buying public.

Even still another object of the present invention is to provide a tree stand system for lifting and retaining and then releasing a load on a tree.

Lastly, it is an object of the present invention to provide a new and improved tree stand system for lifting and retaining and then releasing a load on a vertical generally cylindrical member. The system includes a short cable which is configured to form a major loop around a vertical generally cylindrical member. The short cable contains a first free end with a first minor loop and a second free end with a second minor loop.

The first free end of the short cable extends through the second minor loop at the second free end and then downwardly with a fixed chain link. The fixed chain link is pulled to tighten the major loop and short cable around a vertical generally cylindrical member at an elevated location and to then support a load. The system also includes a long cord having a free upper end coupled to the second minor loop and a free lower end. An intermediate extent passes through the first minor loop whereby pulling the lower end of the cord will enlarge the major loop to allow the releasing and lowering of the short cable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged side elevational view taken at the circle region of FIG. 1.

FIG. 3 is a side elevational view of the elevator assembly portion of the tree stand shown in FIG. 1 but in a partially collapsed orientation.

FIG. 8 is a top elevational view taken along line 8—8 of FIG. 1.

FIG. 9 is a cross sectional view taken along line 9—9 of FIG. 8.

The same reference numerals refer to the same parts throughout the various Figures.

DESCRIPTION OF THE PREFERRED EMBODIMENT

Figure 1:
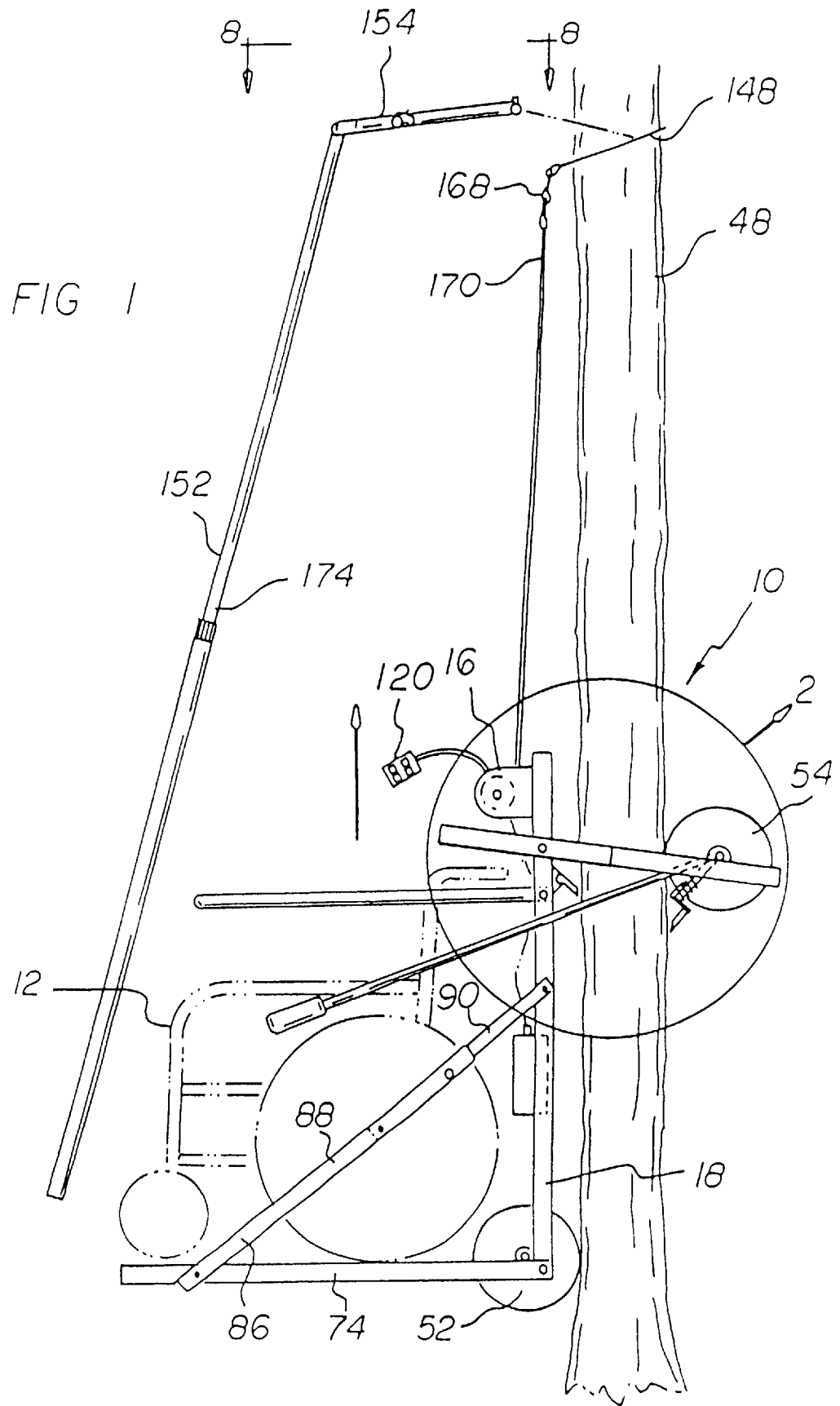
FIG. 1 is a side elevational view of the new and improved tree stand system constructed in accordance with the principles of the present invention.
Figure 4:
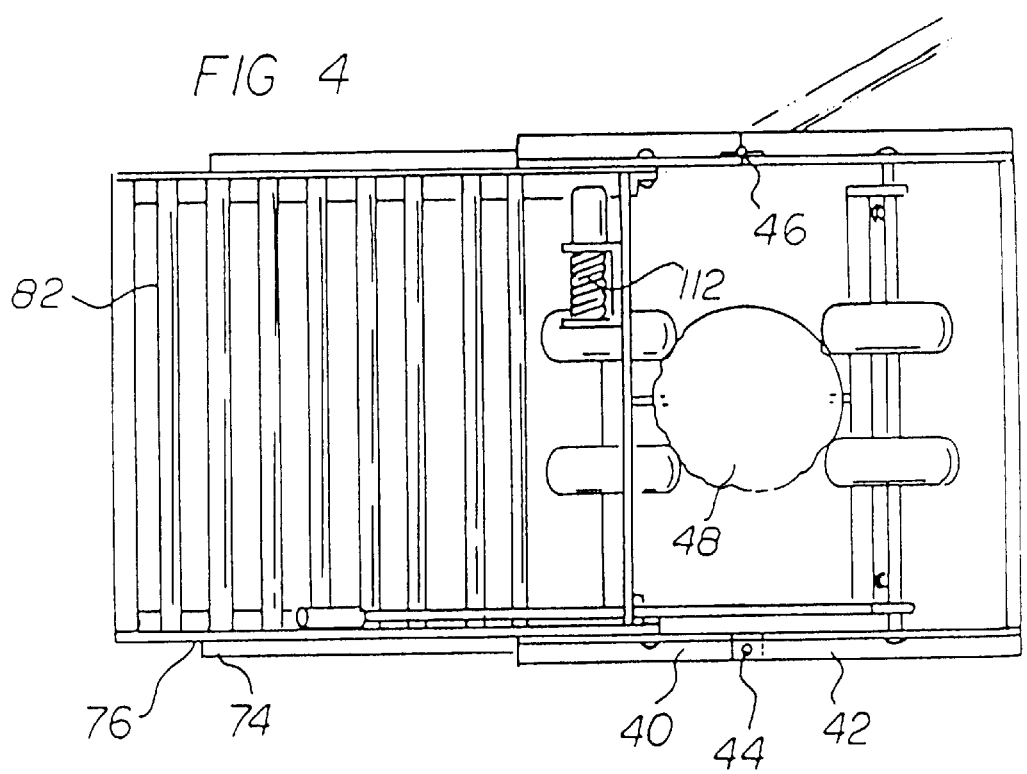
FIG. 4 is a top elevational view taken along line 4—4 of FIG. 3.
Figure 5:
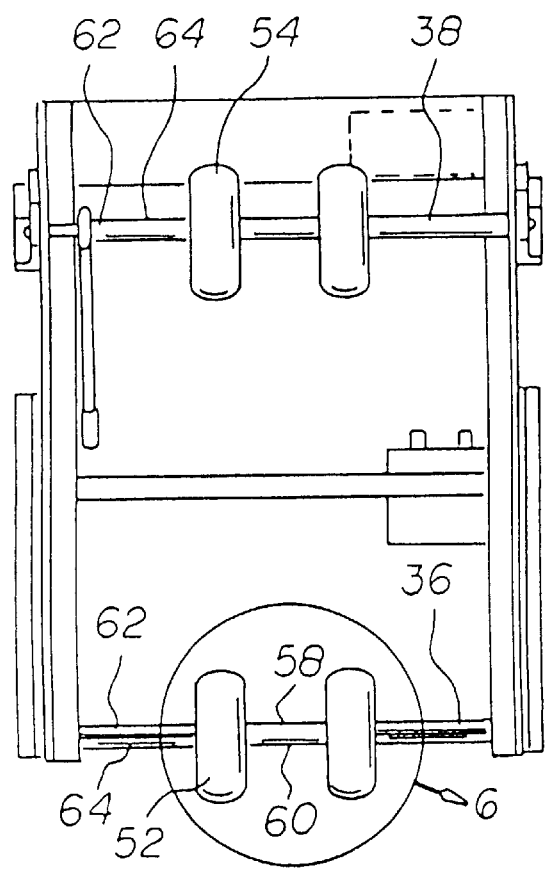
FIG. 5 is an end elevational view taken along line 5—5 of FIG. 3.
Figure 6:
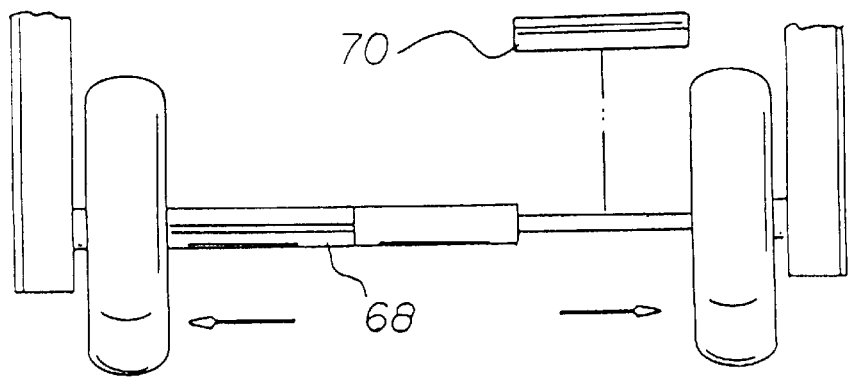
FIG. 6 is an exploded perspective view of one of the axles and its wheels.
Figure 7:
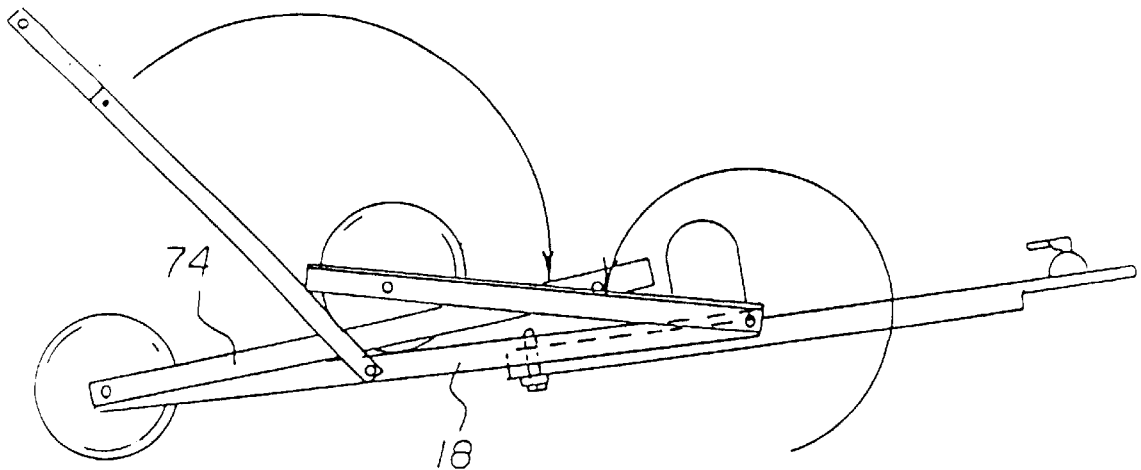
FIG. 7 is a side elevational view similar to FIG. 3 but showing the elevator assembly in a collapsed orientation.
Figure 10:
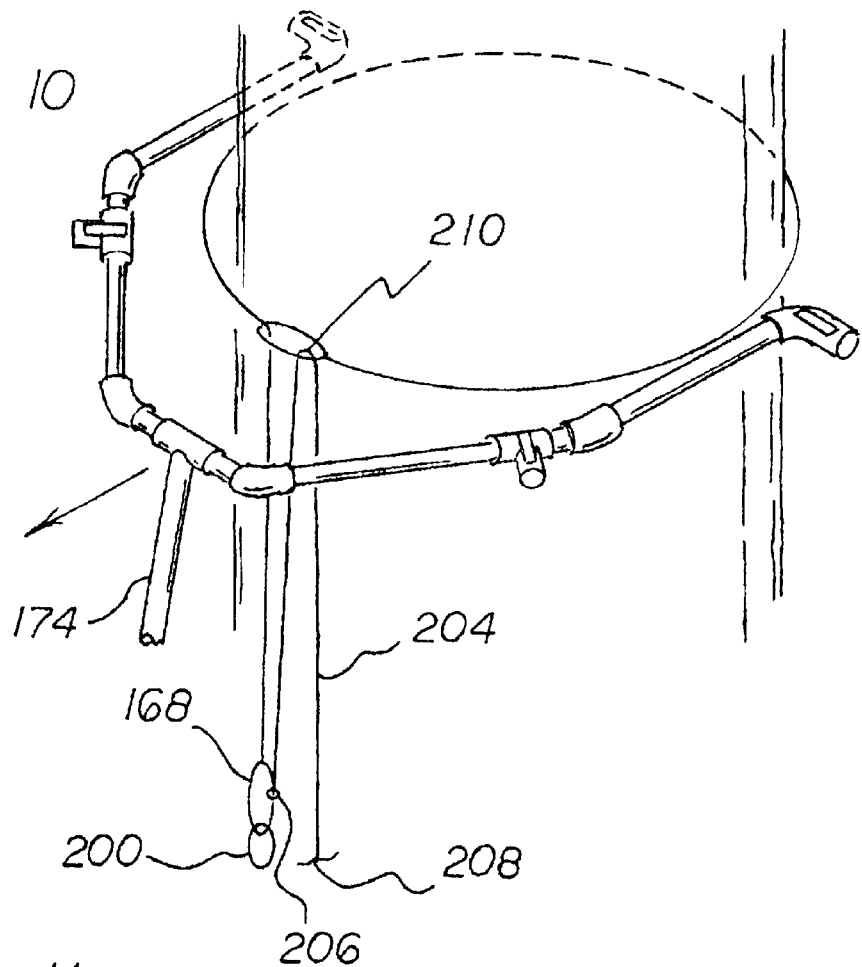
FIG. 10 is a perspective view of the support system during installation on a tree.
Figure 11:
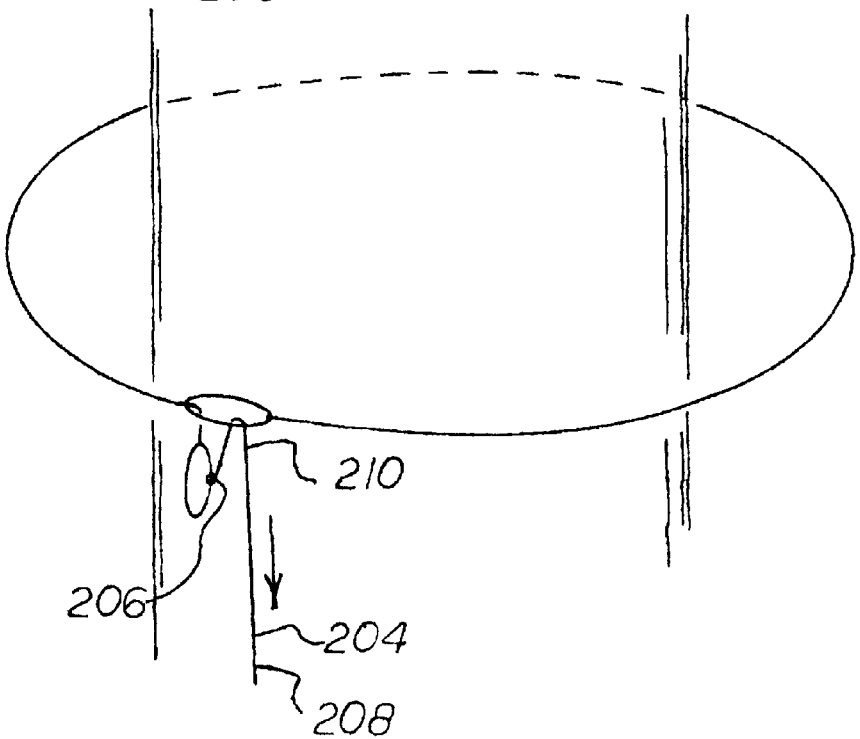
FIG. 11 is a perspective view of the short cable during removal from a tree.

With reference now to the drawings, and in particular to FIG. 1 thereof, the preferred embodiment of the new and improved tree stand system embodying the principles and concepts of the present invention and generally designated by the reference numeral 10 will be described.

The present invention, the tree stand 10 automatically controlled by a user, such as a person in a wheelchair 12, is comprised of a plurality of components. Such components in their broadest context include an elevator assembly 16, a pair of primary tires 52, a pair of secondary tires 54, and a pair of support rails 74. Such components are individually configured and correlated with respect to each other so as to attain the desired objective.

An elevator assembly 16 is first provided. The elevator assembly has a pair of parallel primary rails 18 with interior ends 22 and exterior ends 24. The elevator assembly also has a pair of parallel secondary rails 26 with interior ends 28 and exterior ends 30. A pair of pivot pins 52 are provided and couple the primary rails and secondary rails adjacent to their interior ends. A primary axle 36 is provided and couples the exterior ends of the primary rails. A secondary axle 38 is provided and couples the exterior ends of the secondary rails. The secondary rails are formed of two separate sections 40, 42. Also provided are a bolt 44 with a nut on one section and a hinge 46 on the other section to allow the coupling and uncoupling of the secondary rails to permit the elevator assembly to encompass a tree 48.

A pair of primary tires 52 are next provided. The primary tires are rotatably received on the primary axle. A pair of secondary tires 54 are also provided and are rotatably received on the secondary axle. Short internal spacers 58 of a tubular configuration with an axial slit 60 are removably positionable over the axles between the tires and external spacers 62 of a tubular configuration with an axial slit 64 are removably positionable over the axles between the tires and the rails. In this manner the tires are held in closely spaced relationship during operation and use. Elongated spacers 68 of a tubular configuration with an axial slit 70 removably positionable over the axles are next provided. The elongated spacers function to hold the tires adjacent to the rails when transporting the system from one location to another.

A pair of parallel support rails 74 are next provided. The support rails have free first ends 76 and second ends 78 pivotably coupled by pins 80 to the exterior ends of the primary rails. A plurality of tubular cross bars 82 are provided between the support rails for receiving a wheelchair thereupon.

A pair of parallel angled rails 86 are next provided. The angled rails are formed of separable sections 88, 90. The separable sections have top ends 92 pivotably coupled by pins 94 to intermediate regions 96 of the primary rails. The separable sections also have bottom ends 98 pivotably coupled by pins 100 adjacent to the first ends of the support rails. An intermediate component 102 of the separable sections is pivotably coupled by pins 104, 106 to the separable sections remote from their top and bottom ends to allow movement of the separable sections between an in-line orientation during operation and use and a separated orientation during movement of a wheelchair to and from the support rails.

A top rail 110 is provided. The top rail couples the interior ends of the primary rails with a winch 112. A motor 116 is provided for rotating the winch. A battery 118 is provided there adjacent for energizing the motor. A control box 120 is also provided for operatively coupling to the motor. The control box is under the control of a user who may thereby selectively power the winch to raise and lower the elevator assembly along a tree.

A locking pin 122 is next provided. The locking pin has a support end 126 pivotably mounted on the secondary axle. A pointed free end 128 of the locking pin is adapted to penetrate a tree when the elevator assembly is in a raised orientation for securement purpose. A spring 130 is provided for urging the free end into a tree. The locking pin has a support end. The support end includes a handle 134. The handle has a forward end 136 under the control of an operator for rotating the pin for engaging and disengaging the tree. An additional pin 138, facing oppositely from the locking pin 122, may also be utilized.

A U-shaped guard 140 is next provided. The U-shaped guard has free ends pivotably coupled by pins to an upper extent of the primary rails to secure the user and wheelchair in position.

A short cable 148 and a cable positioning member 152 are next provided. The cable positioning member includes a C-shaped upper component 154. The upper component is provided with a plurality of resilient fingers 156 for releasably supporting the short cable configured in a major loop 158 around a tree. The short cable has free ends 162, 164 each with a minor loop 166, 168. One end of the short cable extends through the first minor loop 166 at the other end 164. A long cable 170 is provided and is coupled between the winch and a minor loop 168 of the short cable. The cable positioning mechanism also includes a long rod 174 for elevating the upper component and short cable to an intended height prior to energizing the winch and raising the elevator assembly.

Individuals with disabilities have special needs and limitations and the number of disabled hunters is increasing. The increase is attributable to the availability of adaptive hunting equipment, sportsmen's organizations and programs that provide hunting opportunities for disabled hunters. Permanent stands must be located where enough game frequent the area to warrant their use. The present invention is transportable to different locations. The present invention can help those who have had a disability for years as well as those new to the challenge to regain the passion of hunting.

The present invention, the support system 10, is comprised of a plurality of components. Such components in their broadest context include a short cable, a long cord and a long cable. Such components are individually configured and correlated with respect to each other so as to attain the desired objective.

The system includes a short cable 148 containing a plurality of wires twisted together. The short cable is configured to form a major loop 158 around the tree containing a first free end 162 with a first minor loop 166 and a second free end 164 with a second minor loop 168. The second free end of the short cable extends through the first minor loop at the first free end and then downwardly with a fixed chain link 200. The fixed chain link is pulled to tighten the major loop and short cable around a tree at an elevated location and to then support a load.

The system also contains a long cord 204 containing a plurality of braided strings. The cord includes a free upper end 206 coupled to the second minor loop, a free lower end 208 and an intermediate extent 210 passing through the first minor loop whereby pulling the lower end of the cord will enlarge the major loop to allow the releasing and lowering of the cable.

A long cable 170, coupled to the fixed chain link and the second minor loop supports a load to an intended height on the tree. The system also includes a cable positioning member 152 including a C-shaped upper component 154 with a plurality of resilient fingers 156 for releasably supporting the short cable configured in a major loop around a tree. The cable positioning member also includes a long rod 174 for elevating the upper component and short cable to an intended height.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tree stand system for lifting and retaining and then releasing a load on a tree, comprising, in combination:

a short cable containing a plurality of wires twisted together, the short cable being configured to form a major loop around a tree, the short cable containing a first free end with a first minor loop and a second free end with a second minor loop, the second free end of the short cable extending through the first minor loop at the first free end then downwardly with a fixed chain link to be pulled to tighten the major loop and short cable around a tree at an elevated location and to then support a load;

a long cord containing a plurality of braided strings, the cord having a free upper end coupled to the second minor loop and a free lower end and an intermediate extent passing through the first minor loop whereby pulling the lower end of the cord will enlarge the major loop to allow the releasing and lowering of the cable;

a long cable coupled to the fixed chain link and the second minor loop, the long cable supports a load at an intended height on the tree; and a cable positioning member including a C-shaped upper component with a plurality of resilient fingers for releasably supporting the short cable configured in a major loop around a tree, the cable positioning mechanism also including a long rod for elevating the upper component and short cable to an intended height.

2. A support system for lifting and retaining and then releasing a load on a vertical generally cylindrical member, comprising, in combination:

a short cable being configured to form a major loop around a vertical generally cylindrical member, the short cable containing a first free end with a first minor loop and a second free end with a second minor loop, the second free end of the short cable extending through the first minor loop at the first free end then downwardly with a fixed link to be pulled to tighten the major loop and short cable around a vertical generally cylindrical member at an elevated location and to then support a load;

a long cord having a free upper end coupled to the second minor loop and a free lower end and an intermediate extent passing through the first minor loop whereby pulling the lower end of the cord will enlarge the major loop to allow the releasing and lowering of the short cable.

3. The system as set forth in claim 2, further comprising a long cable coupled to the fixed link and the second minor loop, the long cable supporting a load at an intended height on the vertical generally cylindrical member.

4. The system as set forth in claim 3, and further comprising a cable positioning member including a C-shaped upper component with a plurality of resilient fingers for releasably supporting the short cable configured in a major loop around the vertical generally cylindrical member, the cable positioning member also including a long rod for elevating the upper component and short cable to an intended height.

* * * * *